B. LIEBOWITZ.
VEHICLE SUSPENSION.
APPLICATION FILED APR. 27, 1916. RENEWED APR. 17, 1917.
1,422,586.    Patented July 11, 1922.
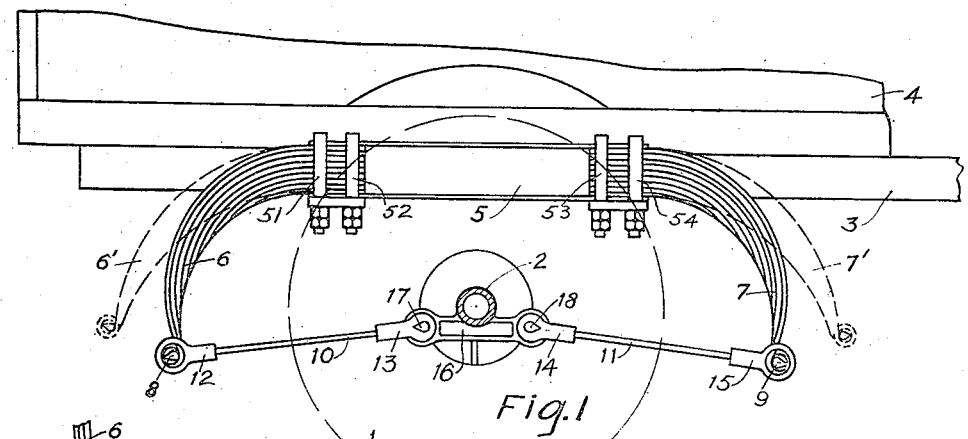
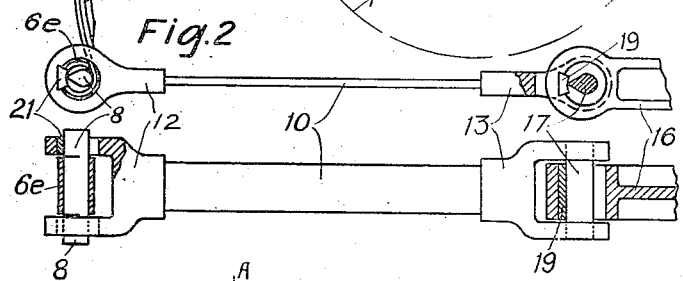
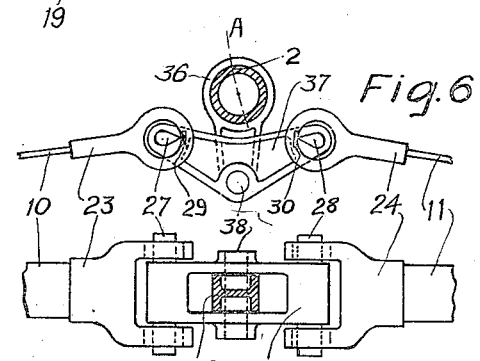
Benjamin Liebowitz
Inventor
By his Attorney
Lester Dittenhoefer

UNITED STATES PATENT OFFICE.

BENJAMIN LIEBOWITZ, OF NEW YORK, N. Y.

VEHICLE SUSPENSION.

1,422,586. Specification of Letters Patent. Patented July 11, 1922.

Application filed April 27, 1916, Serial No. 93,337. Renewed April 17, 1917. Serial No. 162,757.

*To all whom it may concern:*

Be it known that I, BENJAMIN LIEBOWITZ, a citizen of the United States, residing at the city, county, and State of New York, have invented certain new and useful Improvements in Vehicle Suspensions, of which the following is a specification.

My invention relates to suspensions of the character disclosed in my Patent No. 1,240,992, issued Sept. 25, 1917, in which resilient support of body on axle is obtained by means of angularly movable tension members acting in conjunction with initially strained springs, the initial strain whereof is greater than the subsequent strains due to normal relative displacements of body and axle.

The principal objects of this invention are, to improve the construction of the suspension so that it may be readily applied to the present types of motor trucks and automobiles, to provide tension members which are laterally stiff and torsionally flexible, and to reduce the friction of the pivotal supports of the tension members.

To these ends, as well as to attain other objects not specifically stated, my invention consists in the construction and arrangement of parts hereinafter described and particularly pointed out in the claims. In the accompanying drawings, Fig. 1 is a diagrammatic side view of a suspension embodying my invention in one form. Fig. 2 is a detail side view of one of the tension members and its supporting pivots partly in section; Fig. 3 is a plan view of the same; Fig. 4 is a fragmentary side view of a modified construction; Fig. 5 is a plan view thereof partly in section and, Figs. 6 and 7 are fragmentary detail views of another modification.

Referring to the drawings, 1 indicates a wheel; 2 an axle; 3 the frame and 4 the body of an automobile or motor truck, all of which parts may be of any ordinary or approved construction and require no further description.

Rigidly fastened to the frame 3 is a channel 5, into the ends of which are secured spring-sections 6, 7 by means of clips 51, 52, 53 and 54. If desired, a continuous spring may be used instead of the divided spring structure, but I prefer to employ the latter as it saves unnecessary length of spring material.

The spring 6—7, in an unstrained condition, would assume the shape indicated by the dotted lines 6'—7', but in my suspension it is subjected to a large initial strain by being bent, as shown in Fig. 1, and held in such position by restraint of the tension members. The application of large initial strain or tension to the spring, when it is sustaining no load, is an essential condition to the proper working of the suspension, as is fully described in my patent hereinabove referred to.

The left tension member comprises forked end pieces or forgings 12 and 13 connected by a flat, relatively wide and thin, metal strap 10, and similarly the right tension member consists of end pieces 14 and 15 and a connecting strap 11. The strap-like formation of the portions 10 and 11 give the tension members torsional flexibility while retaining lateral stiffness. Such construction prevents side sway of the suspension, and permits the axle to tilt, due to differences in level of the wheels at the opposite ends of the axle, without torsionally straining the spring or frame.

A yoke or member 16 is rigidly fastened to the axle. The inner ends of the tension members are pivoted to the yoke, while their outer ends are pivoted to the spring. In operation of the suspension, relative movement of body and axle produces angular movement of the tension members, and it is desirable, therefore, in order not to interfere unduly with the flexibility of the suspension, that the tension members should work on their pivots with little frictional resistance.

To that end I provide the structure with knife-edge or rocker pivots, as is best seen in Figs. 2 and 3. Rigidly fastened in the spring-eye $6^e$ is a pin 8 provided with knife-edges, which bear on the hardened bearing surfaces 21, secured in the forks of the end piece 12 of the tension member. The pivot at the opposite end of the tension member comprises a pin 17, which is fixed in the forks of the end piece 13 and is provided with a knife-edge, which works on a bearing block 19 of the yoke 16. The construction of the rocker pivots 9 and 18 of the right-hand tension member is similar to that of the pivots 8 and 17. In the drawings I have shown a different form of rocker pivot at each end of the tension members, but it will be understood that either form of construction may be used at both ends if desired. Preferably, however, the construction shown in the left hand end of Fig. 2 should be used at both ends of the tension members, that is, the construction in which the rocker bearing or seat is rigid with the tension member and the rocker pin rigid with the spring-eye or axle yoke eye, as the case may be. The reason for this is that the force of the tension members should always be at right angles to the rocker seat at the point of contact in order to avoid slippage under large angular displacements.

The suspension shown in Fig. 1 is suitable for both the front and rear axles of a motor vehicle in any case where, upon application of a vertical force, the axle will move in a plane substantially perpendicular to the body. Where, however, due to the constraint of radius rods, this condition is departed from, as in the case of the rear axle of a chain driven car, the construction hereinabove described will preferably be modified to allow for the curvilinear motion of the axle without causing an undesirable deflection of the spring. This may be accomplished by pivoting the channel 5 to the frame 3 instead of rigidly fastening it as described.

Preferably, however, I provide a construction whereby the axle is permitted to move fore-and-aft, as required by the curvilinear constraint, without carrying the pivots fore-and-aft with it.

An example of the latter construction is shown in Figs. 4 and 5, in which 26 indicates a yoke provided at its lower end with two knife-edged pivots 27 and 28 placed as close together as is practicable so that as the yoke rocks they will deviate only slightly from their normal horizontal plane. The knife edges of said pivots bear on the hardened bearing blocks 29, 30 of the end forgings 23, 24 of the tension members 10 and 11. In this case the axle is caused to move through the arc A by constraint of the radius rods (not shown) such as are usually employed in chain driven cars. That movement will cause the yoke 26 to rock and will maintain the pivots 27, 28 in a relatively fixed position horizontally. This prevents the spring from being unduly deflected by reason of the horizontal component of the curvilinear motion of the axle.

Another modification for the same purpose is shown in Figs. 6 and 7 in which the yoke 37 is pivotally mounted on the pin 38 fixed to the link 36, which link depends from the axle 2. In this construction the horizontal component of the axle displacement is taken care of by a rocking motion of the link 36.

Where the axle is pivotally connected to the radius rods, as in most chain driven cars, the yoke 26 or the link 36, as the case may be, will be rigidly fastened to the axle, but otherwise it will hang loosely thereon.

It is obvious that various modifications in the details of construction and arrangement of parts may be made within the spirit and scope of my invention.

By the term "initial strain," as used in this specification and the annexed claims, I mean the strain to which the spring is subjected when the suspension is in no load position; that is the initial strain is the minimum strain to which the spring is subjected through the range of the suspension movement.

What I claim is:

1. In a vehicle suspension, an initially strained spring attached to the frame, the initial strain whereof is large in comparison with the subsequent strains due to normal relative displacements of body and axle, a yoke attached to the axle, and a pair of tension members secured at their ends to the yoke and to the ends of the spring respectively by means of rocker pivots.

2. In a vehicle suspension an initially strained leaf spring, the initial strain whereof is greater than the maximum subsequent strains due to relative displacements of body and axle within the limit of the spring design, and a pair of tension members pivotally connecting the ends of the spring with the axle.

3. In a vehicle suspension an initially strained leaf spring fixed to the frame, the initial strain being large in comparison with the subsequent strains due to normal relative displacements of body and axle, a member attached to the axle, and a pair of tension members pivotally secured at their ends to the axle member and to the ends of the spring respectively.

4. In a vehicle suspension the combination of an axle, a vehicle frame, a pair of leaf springs secured to said frame and extending downwardly on opposite sides of the axle, said springs being subjected to an initial strain which is greater than the maximum subsequent strains due to relative displacements of body and axle within the limits of the spring design, and a pair of tension members connecting the lower ends of said springs to the axle.

5. In a vehicle suspension the combination of an initially strained spring, a yoke, and a pair of tension members pivotally secured at their ends to the yoke and to the ends of the spring respectively, the portion of each tension member, intermediate the pivots, being relatively wide and thin whereby to secure lateral stiffness and torsional flexibility.

6. In a vehicle suspension the combination of an initially strained spring, a yoke, and a pair of tension members pivotally secured at their ends to the yoke and to the ends of the spring respectively, the intermediate portion of each tension member comprising relatively thin flanges arranged to provide torsional flexibility and flexural stiffness.

BENJAMIN LIEBOWITZ.